United States Patent
Wang

(10) Patent No.: US 8,233,946 B2
(45) Date of Patent: Jul. 31, 2012

(54) ELECTRONIC DEVICE WITH BATTERY SECURING MECHANISM

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 391 days.

(21) Appl. No.: 12/477,262

(22) Filed: Jun. 3, 2009

(65) Prior Publication Data
US 2010/0053910 A1    Mar. 4, 2010

(30) Foreign Application Priority Data

Aug. 29, 2008 (CN) .......................... 2008 1 0304305

(51) Int. Cl.
*H04M 1/00* (2006.01)
*H05K 7/00* (2006.01)

(52) U.S. Cl. ............. 455/575.1; 455/550.1; 361/679.01; 361/747; 361/732; 361/814; 429/96; 429/97; 429/100

(58) Field of Classification Search .............. 429/96, 429/97, 100; 361/679.01, 747, 679.38, 679.58, 361/732, 347, 679.02, 728, 474, 814, 679.57; 174/50, 520, 561, 562; 455/349, 550.1, 572, 455/575.1, 575.8; 320/107
See application file for complete search history.

(56) References Cited

U.S. PATENT DOCUMENTS

| | | | |
|---|---|---|---|
| 5,621,618 A * | 4/1997 | Komiyama | 361/732 |
| 5,716,730 A * | 2/1998 | Deguchi | 429/97 |
| 6,479,184 B1 * | 11/2002 | Shiue | 429/123 |
| 7,274,554 B2 * | 9/2007 | Kang et al. | 361/679.01 |
| 7,346,366 B2 | 3/2008 | Park | |
| 7,476,462 B2 * | 1/2009 | Song et al. | 429/97 |
| 7,531,268 B2 * | 5/2009 | Huang | 429/97 |
| 7,606,022 B2 * | 10/2009 | Kim | 361/679.01 |
| 7,892,668 B2 * | 2/2011 | Choi | 429/97 |
| 7,983,629 B2 * | 7/2011 | Park et al. | 455/90.3 |
| 2004/0038121 A1 | 2/2004 | Song et al. | |
| 2006/0172183 A1 * | 8/2006 | Chen et al. | 429/97 |

FOREIGN PATENT DOCUMENTS

| | | |
|---|---|---|
| CN | 2752968 Y | 1/2006 |
| CN | 101131595 A | 2/2008 |
| TW | 534364 | 1/2002 |
| TW | 563908 | 11/2003 |

\* cited by examiner

*Primary Examiner* — Angel R Estrada
*Assistant Examiner* — Dimary Lopez
(74) *Attorney, Agent, or Firm* — Altis Law Group, Inc.

(57) ABSTRACT

An electronic device includes a main body, a battery, a locking member, and an elastic member. The main body defines a receiving cavity. The receiving cavity has a plurality of sidewalls. One of the sidewalls defines a receiving depression. The battery is detachably received in the receiving cavity. The locking member is fixed on the battery. The locking member includes an elastic resisting portion. The button is positioned on the main body. The elastic member biases the button. The elastic resisting portion is inserted into the receiving depression to fix the battery. When an external force is applied to the button, the button pushes the elastic resisting portion out of the receiving depression so that the battery can be taken out. After the external force is removed, the elastic member pushes the button to return to its original position.

13 Claims, 3 Drawing Sheets

ELECTRONIC DEVICE WITH BATTERY SECURING MECHANISM

BACKGROUND

1. Technical Field

The present disclosure relates to an electronic device and, more particularly, to an electronic device with a battery securing mechanism.

2. Description of Related Art

A typical electronic device includes a main body, an elastic member, and a removable rechargeable battery. The main body defines a rectangular space to receive the battery. The elastic member has two locking members at two ends. Opposite inner sidewalls adjoining the rectangular space define two openings respectively.

In use, the battery is placed into the rectangular space. One locking member of the elastic member is inserted into one opening of the main body. The elastic member is extended over a top of the battery, and the other locking member is inserted into the other opening of the main body, thus securing the battery to the rectangular space. To detach the battery from the main body, an external force is needed to pull the elastic member to deform.

However, the elastic member is small. It is difficult to apply an external force on the elastic member. Thus, it is difficult to detach the battery from the main body.

Therefore, an electronic device with a new battery securing system is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
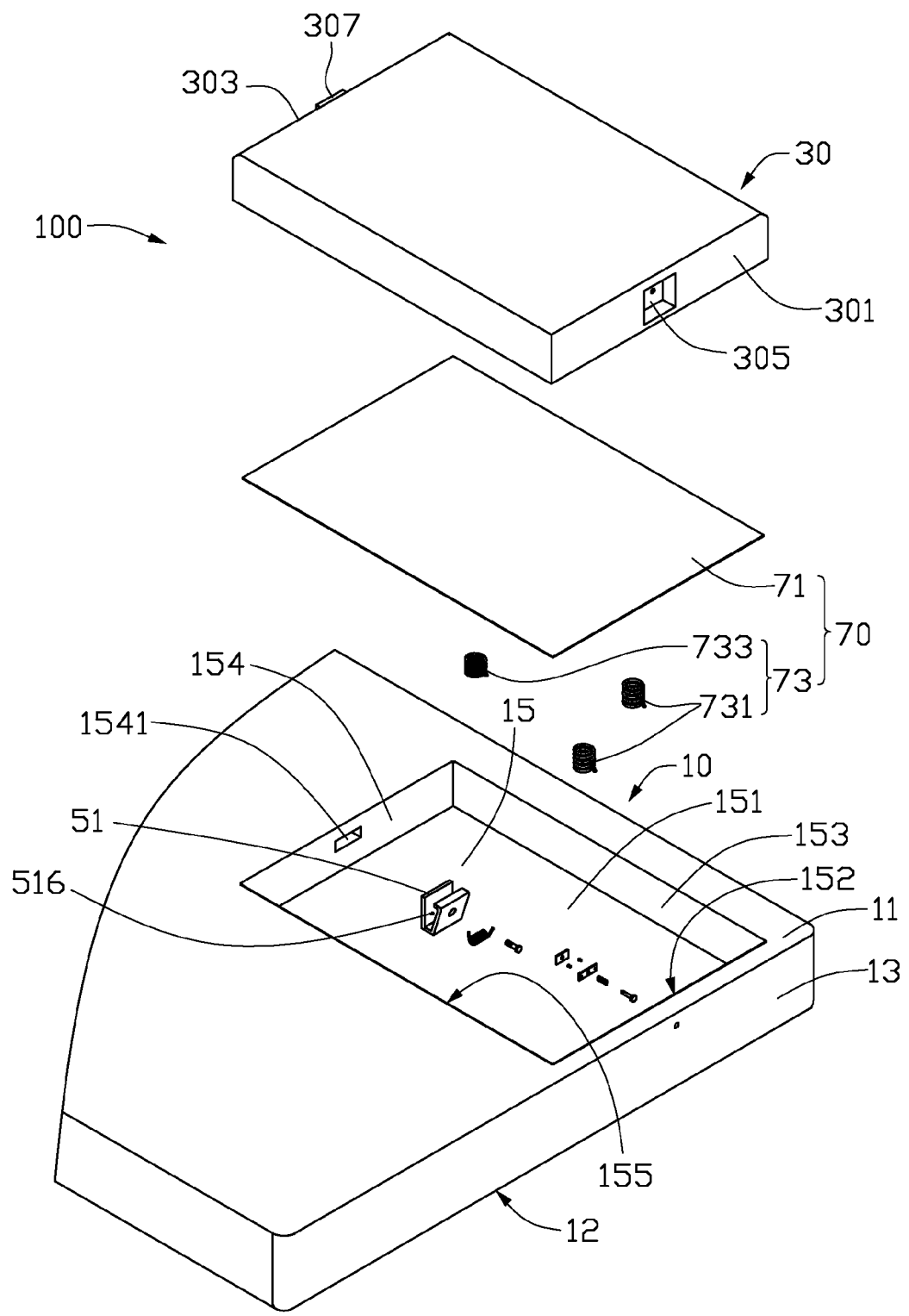
FIG. 1 is an exploded, isometric view of an embodiment of an electronic device.
Figure 2:
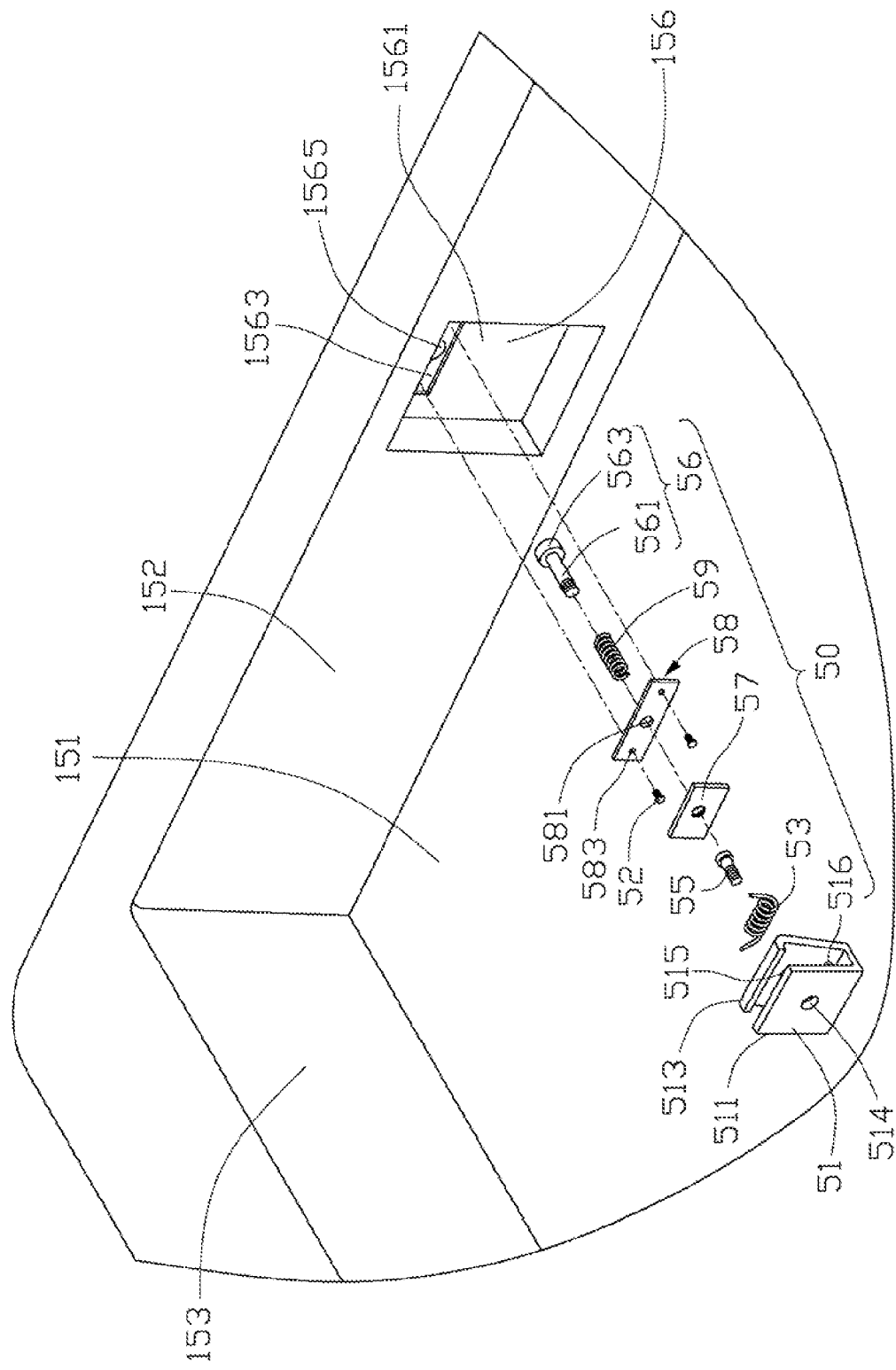
FIG. 2 is an enlarged view of a portion of the electronic device of FIG. 1, viewed from another aspect.

Referring to FIGS. 1 and 2, an electronic device 100 includes a main body 10, a battery 30 positioned on the main body 10, a controlling module 50, and a quick detaching module 70. The latching module 50 and the quick detaching module 70 are used so that the battery 30 can be easily fixed on the main body 10 or detached from the main body 10.

The main body 10 may be substantially rectangular. The main body 10 has a top surface 11, a bottom surface 12 opposite to the top surface 11, and a side surface 13 connecting the top surface 11 to the bottom surface 12. The top surface 11 defines a receiving cavity 15 to receive the battery 30.

In the illustrated embodiment, the receiving cavity 15 is substantially rectangular. The receiving cavity 15 has a bottom surface 151, a first sidewall 152, a second sidewall 153, a third sidewall 154 opposite the first sidewall 151, and a fourth sidewall 155 opposite the second sidewall 153. The first, second, third, and fourth sidewalls 152, 153, 154, 155 extend from the bottom surface 151.

The first sidewall 152 defines a receiving depression 156. The receiving depression 156 may be substantially rectangular. A bottom 1561 of the receiving depression 156 defines an engaging depression 1563. A base portion of the engaging depression 1563 defines a receiving hole 1565 extending through the first sidewall 152 to the side surface 13. The third sidewall 154 defines a latching depression 1541.

The battery 30 is shaped to correspond to the shape of the receiving cavity 15. The battery 30 defines a positioning depression 305 in a first side surface 301 of the battery 30 and forms a latching protrusion 307 on a second side surface 303 opposite to the first side surface 301. The latching protrusion 307 engages in the latching depression 1541. In addition, a bottom of the positioning depression 305 defines a fastener hole (not labeled) therein.

The controlling module 50 includes a locking member 51, a first elastic member 59, two first fasteners 52, a second fastener 55, a button 56, a pushing member 57, a blocking member 58, and a second elastic member 53. The second elastic member 53 may be a torsion spring. The first elastic member 59 may be a compression spring.

The locking member 51 is elastic. The locking member 51 includes a connecting portion 511 and an elastic resisting portion 513 connected to the connecting portion 511. Both the connecting portion 511 and the elastic resisting portion 513 may be substantially plate-shaped. The connecting portion 511 defines a through hole 514 and the elastic resisting portion 513 defines a through hole 515. The elastic resisting portion 513 and the connecting portion 511 cooperatively form a substantially V-shaped structure. Furthermore, the locking member 51 forms two latch rings 516, one latch ring 516 on the connecting portion 511 and the other latch ring 516 on the elastic resisting portion 513.

The button 56 includes a main portion 561 and a contact portion 563 formed on an end of the contact portion 563. The main portion 561 is substantially rod-shaped. An outer diameter of the contact portion 563 is smaller than an inner diameter of the receiving hole 1565. The outer diameter of the contact portion 563 is larger than a diameter of a coil of the first elastic member 59.

The blocking member 58 may be substantially plate-shaped. The blocking member 58 defines a through hole 581 and two fastener holes 583 adjacent to the through hole 581.

The quick detaching module 70 includes a supporting member 71 and an elastic assembly 73. The elastic assembly 73 includes two first resilient members 731 and a second resilient member 733. A length of each resilient member 731 is larger than a length of the second resilient member 733.

Figure 3:
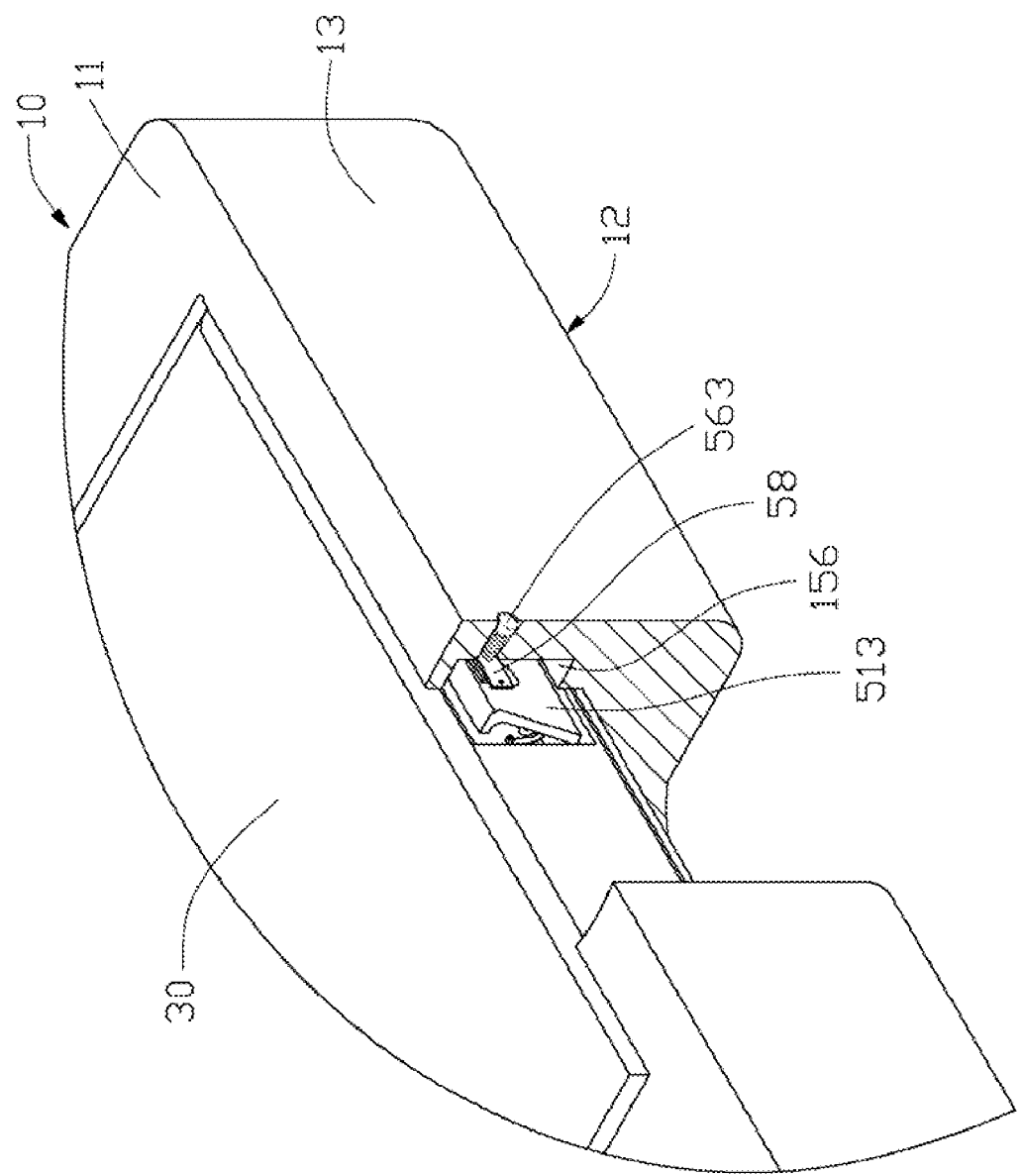
FIG. 3 is an assembled, enlarged view of a portion of the electronic device of FIG. 1.

Referring also to FIG. 3, to assemble the electronic device 100, the main portion 561 is passed through the receiving hole 1565, the first elastic member 59, and the through hole 581 in that order, from outside of the first sidewall 152, and finally engaging with the pushing member 57. Thus, the pushing member 57 is fixed on an end of the main portion 561, away from the contact portion 563, and the blocking member 58 and the first elastic member 59 are located between the pushing member 57 and the contact portion 563.

The blocking member 58 is pushed towards the first sidewall 152 and is fixed on the bottom 1561 of the receiving depression 156 with the first fasteners 52. Thus, the first elastic member 59 is sleeved on the main portion 561 such that an end of the first elastic member 59 resists the contact portion 563 and another end of the first elastic member 59 resists the blocking member 58.

As a result, the button 56 is movable within a predetermined distance due to a limitation created between the base portion of the engaging depression 1563 and the blocking member 58.

Two ends of the second elastic member 53 are inserted into the two latch rings such that the second elastic member 53 is fixed between the connecting portion 511 and the elastic resisting portion 513. The second fastener 55 is passed through the through hole 515 of the elastic resisting portion 513 and the through hole 514 of the connecting portion 511, and engages in the fastener hole of the bottom of the positioning depression 305, such that the connecting portion 511 is fixed on the bottom of the positioning depression 305. Thus, the locking member 51 is received in the positioning depression 305 and a portion of the elastic resisting portion 513 extends out from the positioning depression 305.

The elastic assembly 73 is positioned on the bottom surface 151 of the receiving cavity 15 such that the first resilient members 731 are adjacent to the first sidewall 152, and the second resilient member 733 is adjacent to the third sidewall 154. The supporting member 71 is then positioned on the elastic assembly 73.

The latching protrusion 307 is obliquely inserted into the latching depression 1541 to fix the battery 30 on the main body 10. An end away from the latching protrusion 307 of the battery 30 is then pressed, thereby pressing the battery 30 into the receiving cavity 15.

When the battery 30 is disposed in the receiving cavity 15, the elastic resisting portion 513 contacts the first side surface 301 of the battery 30, thereby deforming the elastic resisting portion 513 and the second elastic member 53.

The battery 30 is fixed in the receiving cavity 15 because the elastic resisting portion 513 is latched in the receiving depression 156 due to an elastic force of the elastic resisting portion 513 and the second elastic member 53. Furthermore, the battery 30 resists the supporting member 71 and the elastic assembly 73 becomes compressed.

The battery 30 is detached from the main body 10 by applying an external force on the contact portion 563 to press the button 56, causing the button 56 to move together with the pushing member 57. The pushing member 57 pushes the elastic resisting portion 513 causing the elastic resisting portion 513 to deform.

When the elastic resisting portion 513 disengages out of the receiving depression 156 completely, the supporting member 71 and the elastic assembly 73 push the battery 30 to move away from the receiving cavity 15.

An end adjacent to the first side surface 301 of the battery 30 rebounds first because the first resilient members 731 have a larger restorative force than the second resilient member 733 An end adjacent to the second side surface 303 of the battery 30 rebounds later. Thus the end adjacent to the first side surface 301 of the battery 30 may be easily held and the battery 30 may be easily removed.

When the button 56 moves towards the battery 30, the first elastic member 59 is compressed by the contact portion 563 and the blocking member 58. After the external force applied to the button 56 is removed, the first elastic member 59 drives the button 56 and the pushing member 57 to return to its original position.

It may be understood that, the second elastic member 53 may be omitted. Furthermore, the connecting portion 511 may be fixed on the bottom of the positioning depression 305 by other means such as welding and adhering.

The pushing member 57 increases an area of a surface that the button 56 contacts with the elastic resisting portion 513, and prevents the button 56 from detaching from the receiving hole 1565.

Finally, while various embodiments have been described and illustrated, the embodiments are not to be construed as being limited thereto. Various modifications can be made to the embodiments by those skilled in the art without departing from the true spirit and scope of the embodiments as defined by the appended claims.

What is claimed is:

1. An electronic device comprising:
   a main body defining a receiving cavity, the receiving cavity having a bottom surface and a plurality of sidewalls extending from the bottom surface, one of the sidewalls defining a receiving depression;
   a battery detachably received in the receiving cavity;
   a locking member fixed on the battery, the locking member comprising an elastic resisting portion;
   a button positioned on the main body;
   a first elastic member biasing the button; and
   a quick detaching module positioned in a bottom of the receiving cavity, the quick detaching module comprises a supporting member and an elastic assembly positioned on the bottom of the receiving cavity, wherein the supporting member is positioned on the elastic assembly, the elastic resisting portion is latched in the receiving depression to fix the battery on the main body; when an external force is applied to the button, the button pushes the elastic resisting portion out of the receiving depression so that the battery can be taken out of the receiving cavity; when the external force is removed, the first elastic member pushes the button to return to its original position.

2. The electronic device of claim 1, wherein the battery is substantially rectangular and the locking member is positioned on a side surface thereof.

3. The electronic device of claim 2, wherein the locking member further comprises a connecting portion connected to the elastic resisting portion; the connecting portion is fixed on the battery.

4. The electronic device of claim 2, wherein the button comprises a main portion and a contact portion formed on an end of the main portion; the main body comprises a top surface, a bottom surface opposite to the top surface, and a side surface connecting the top surface to the bottom surface; the receiving cavity is defined in the top surface; the receiving cavity has a bottom, a first sidewall, a second sidewall, a third sidewall, and a fourth sidewall; the receiving depression is defined in the first sidewall; a bottom of the receiving depression defines an engaging depression; a base portion of the engaging depression defines a receiving hole extending through the first sidewall; the main portion is received in the receiving hole.

5. The electronic device as claimed in claim 4, further comprising a pushing member fixed on an end of the main portion, away from the contact portion.

6. The electronic device as claimed in claim 4, wherein the main body is substantially rectangular.

7. The electronic device as claimed in claim 6, further comprising a blocking member fixed on the base portion of the engaging depression, wherein the blocking member defines a through hole; the main portion is passed through the through hole of the blocking member; the first elastic member is sleeved on the main portion such that an end of the first elastic member resists the contact portion and another end of the first elastic member resists the blocking member.

8. The electronic device as claimed in claim 7, wherein the first elastic member is a compression spring; an outer diameter of the contact portion is smaller than an inner diameter of the receiving hole in the base portion of the engaging depression, and the outer diameter of the contact portion is larger than a diameter of the first elastic member.

9. The electronic device as claimed in claim 4, wherein the first sidewall is opposite to the third sidewall, and the second sidewall is opposite to the fourth sidewall; the third sidewall defines a latching depression; the battery forms a latching protrusion to engage in the latching depression.

10. The electronic device as claimed in claim 1, wherein the locking member further comprises a connecting portion connected to the elastic resisting portion; the connecting portion and the elastic resisting portion are substantially plate-shaped; the elastic resisting portion and the connecting portion cooperatively form a substantially V-shaped structure.

11. The electronic device as claimed in claim 10, further comprising a second elastic member fixed between the connecting portion and the elastic resisting portion.

12. The electronic device as claimed in claim 11, further comprising a plurality of latch rings, wherein the second elastic member is fixed between the connecting portion and the elastic resisting portion by the latch rings.

13. The electronic device as claimed in claim 1, wherein the elastic assembly comprises two first resilient members and a second resilient member, the elastic assembly is positioned on the bottom of the receiving depression such that the first resilient members are positioned adjacent to the receiving depression, and the second resilient member is positioned away from the receiving depression.

* * * * *